May 30, 1967  M. L. B. RAO  3,322,535
ADDITION AGENTS FOR EXOTHERMIC SINTERING PROCESSES
Filed June 1, 1965  2 Sheets-Sheet 1

INVENTOR
MLARUR L. B. RAO
BY
ATTORNEY

May 30, 1967 M. L. B. RAO 3,322,535
ADDITION AGENTS FOR EXOTHERMIC SINTERING PROCESSES
Filed June 1, 1965 2 Sheets-Sheet 2

INVENTOR
MLARUR L.B. RAO
BY
ATTORNEY

United States Patent Office 3,322,535
Patented May 30, 1967

3,322,535
ADDITION AGENTS FOR EXOTHERMIC
SINTERING PROCESSES
Mlarur L. B. Rao, Burlington, Mass., assignor to P. R.
Mallory & Co. Inc., Indianapolis, Ind., a corporation
of Delaware
Filed June 1, 1965, Ser. No. 460,044
12 Claims. (Cl. 75—201)

ABSTRACT OF THE DISCLOSURE

The fabrication of porous, sintered bodies of zinc, aluminum, magnesium, zirconium and titanium is disclosed. The process involves the mixing of one of the metal powders having an impurity oxide film with chemical agents such as the halides of ammonia, aluminum and zinc, hydrazine hydrochloride and ammonium acid oxalate in quantities of at least 2 percent by weight of the mixture. A chemical reaction results between the chemical agent and the oxide film carried on the surface of the metallic powder. The mixture is compacted at a suitable pressure. The chemical reaction cleans the metal particles in situ and liberates heat sufficient to sinter the compact to thereby form a porous structure. The compact is heated to a temperature not greater than one-third the sintering temperature of the metal particles to sublime the excess chemical agent or the excess chemical agent may be leached with a suitable organic solvent-water mixture. After the excess chemical agent is removed, a porous sintered body remains.

Figure 1:
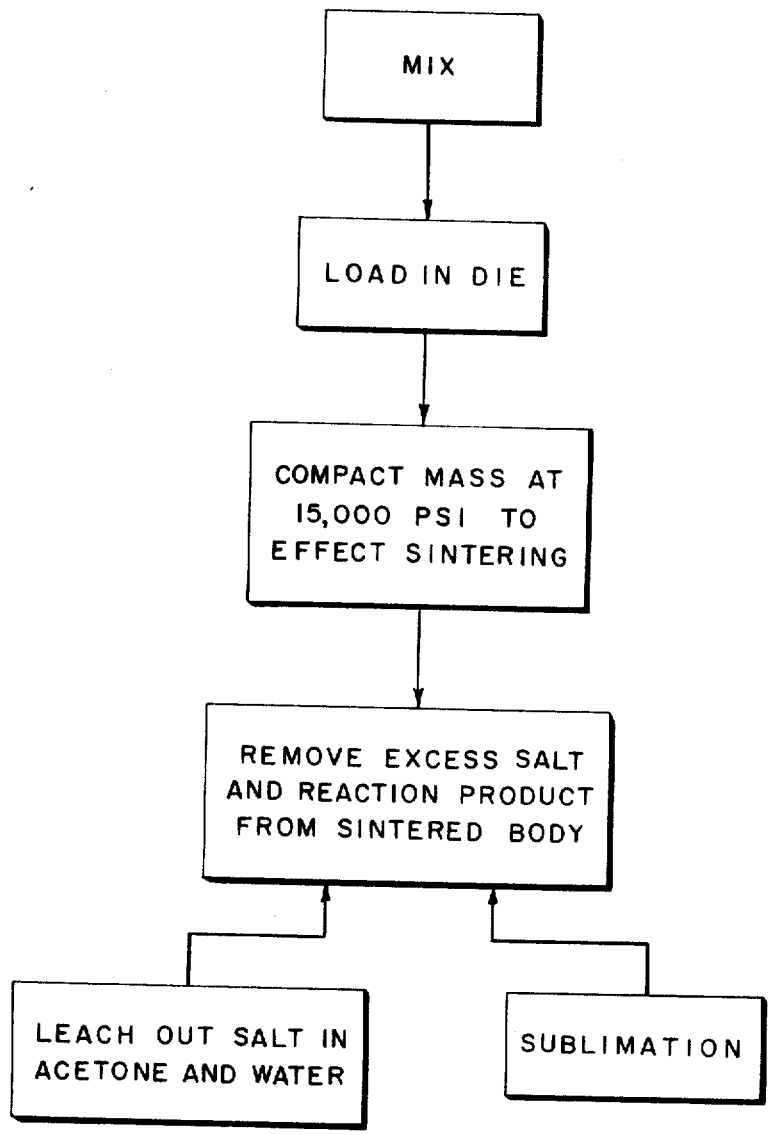

The present invention relates to means and methods for the fabrication of solid structures from metal particles and more particularly relates to the fabrication of porous structures of film metals.

The science of powder metallurgy has enabled complex metal structures to be produced by methods which are economically advantageous in comparison with other metal shaping techniques. The production of a structure by powder metallurgy techniques generally involves the steps of pressing a mass of metal particles into a desired shape and then sintering the pressed compact to cause the metal particles to coalesce.

The uses to which structures fabricated by powder metallurgy are applied are varied, and consequently a broad range of densities and porosities is required. High density bodies are employed in those situations where the physical properties of the metal in its elemental form are to be duplicated as closely as possible. On the other hand, certain applications require structures of high porosity and low density. Such items as self-lubricated bearings, filters and diaphragms fall into the latter class.

In general, the density of a structure may be controlled over a wide range by judicious choice of the conditions under which it is produced. However, for a certain group of metals, there existed a limitation in the prior art powder metallurgy processes which precluded the fabrication of structures of less than a certain density. This limitation resulted from certain requirements of the pressing step.

The pressing step must necessarily result in the formation of metal-to-metal contacts among the particles so that the grain growth necessary to produce a unified mass may occur during the sintering operation. If the particles have an oxide coating, the coating must be partially cracked or broken or otherwise removed to permit the formation of the necessary metal-to-metal contacts. If the particles from which the porous body is to be fabricated consist of a relatively soft metal coated with a relatively hard oxide, sufficient metal-to-metal contact is difficult to achieve and high-density, low porosity structures result. While some of the problems related to the pressing step have been resolved by the prior art, there are still a number of problems in the sintering step which heretofore have been unresolved in the fabrication of certain metal structures. As a result of the difficulties, high-density, low porosity structures result.

For example, particular difficulty has been encountered in the fabrication of anodes for electrolytic capacitors. While there is no difficulty in producing satisfactory porous tantalum anodes, no satisfactory method has been encountered for producing porous aluminum anodes. Prior attempts have resulted in structures of such low porosity that no effective increase in surface area is attained. Other metals which have heretofore presented difficulties in obtaining a satisfactory solid structure by powder metallurgy techniques include, zirconium, magnesium, titanium and zinc.

The addition of volatile organic solvents and binders, metal hydrides and metal powders to aid the sintering of metals not readily sintered is known. However, the present invention involves an altogether different principle for the selection of addition agents for the sintering steps.

It is therefore an object of the present invention to provide a class of sintering agents which makes it possible to sinter metals such as aluminum and zinc which cannot be readily sintered with existing methods.

It is an object of the present invention to provide sintering agents which eliminate the need for binders and fillers and which clean the metals in situ.

It is an object of the present invention to provide a class of sintering agents which undergo an exothermic decomposition when mixed with metals having an impurity oxide film so that during compacting of the mix the heat liberated effects the sintering of metals thereby eliminating the necessity for the application of heat to the compact to effect sintering.

It is an object of the present invention to provide a class of sintering agents which clean the metal in situ by an electrochemical displacement reaction, said reaction partially effecting sintering, the sintering being completed upon the application of heat to the system.

It is an object of the present invention to provide a method of sintering relatively soft metals having relatively hard oxide coatings which is more economical than the present, less satisfactory methods.

It is an object of the present invention to provide a method of sintering which reduces the sintering temperature and time over methods known in the art.

It is an object of the present invention to provide sintered bodies of the aforementioned metals having a minimum porosity of 40%.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein the scope thereof will be determined from the dependent claims.

Other objects of the invention and the nature thereof will become apparent from the following description considered in conjunction with the accompanying drawings, and the scope thereof will be determined from the dependent claims.

Figure 2:
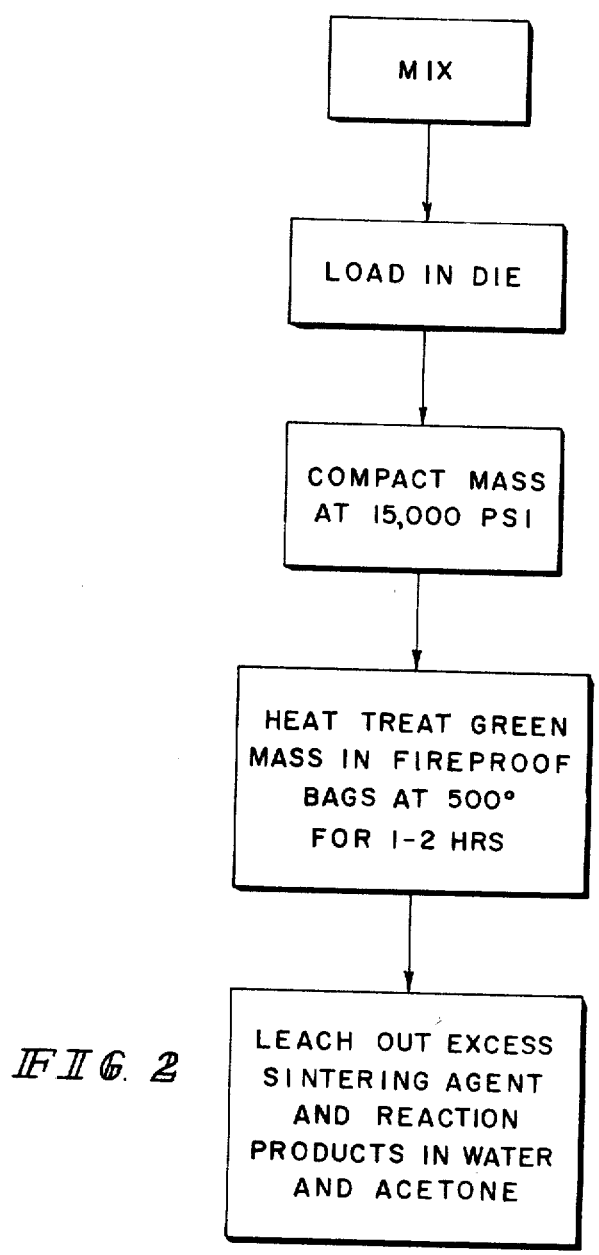

In the drawings:
FIGURE 1 is a flow chart of the method for fabricating porous sintered structures wherein a corrosion sintering agent is utilized; and FIGURE 2 is a flow chart of the method for fabricating porous sintered structures wherein an electrochemical displacement sintering agent is utilized.

Generally speaking the process of the present invention comprises the application of chemical corrosion and/ or the utilization of electromotive force differences that exist at metal-molten salt interfaces to remove the refractory oxide and to sinter metal and alloy fibers or powders. There are two classes of materials which meet the objects of the present invention: (I) low melting salts which serve to clean the surface of the particles to be sintered and which bring about sintering either by chemical corrosion, double decomposition, redox processes, or fluxing of the protective refractory films which in turn exposes the metal and realizes the metal-to-metal contact required to produce a high density, high porosity structure; (II) salts which serve to clean the surface of the particles to be sintered and are involved in surface alloy formation due to the electrochemical displacement reactions with the metal or alloy fibers or powders to be sintered.

As an example of Class I addition agents, upon addition of ammonium chloride to zinc powder and subsequent pressing, an exothermic corrosion reaction results which leads to the removal of zinc oxide from the zinc particles thereby cleaning the metal in situ. The heat evolved in the corrosion reaction is sufficient to sinter the zinc powder. The excess ammonium chloride and zinc chloride are removed by further application of heat to sublime the salts, or they may be leached out in a suitable solvent mixture of low dielectric constant, such as acetone and water, to prevent further corrosion of the sintered mass. In addition to ammonium chloride, aluminum chloride, zinch chloride, hydrazine hydrochloride and ammonium acid oxalate are suitable Class I sintering agents. When the above agents are utilized, the heat liberated in the chemical reaction during pressing is sufficient to sinter the compacted mass and no external heat source is necessary. If additional heat is supplied, it is only to sublime the excess sintering agent and any resulting reaction products. However, the sublimation heat applied is approximately one-third the heat required to sinter the metal.

In considering Class II addition agents, because of the difference in their electromotive forces, aluminum displaces zinc, silver, mercury, etc., from their molten halide salts. Therefore, upon mixing of aluminum fibers or powder with zinc chloride and heating the compact to 500° C. the zinc chloride becomes molten, and an electrochemical reaction involving the formation of zinc and aluminum chloride results. During this process, the metal surface at the metal-molten salt interface is cleaned in situ thereby exposing the metal and allowing the desired sintering to result. The sintering bonds may involve Al—Al, Al—Zn—Al and/or Al—Zn—Zn—Al, etc. Sintering is then obtained by subjecting the mass to external heat.

In the case of both the corrosion agents and those salts which operate due to electrochemical displacement, the particles to be sintered are cleaned in situ. That is, no additional step is required to remove the hard refractory oxide coating on the particles prior to pressing and sintering. As the oxide coating prevents good sintering, the present method has overcome one of the greatest difficulties in the sintering of metals such as zinc, aluminum, etc.

In the operation of the present invention a suitable salt of Class I or Class II is first selected. The melting point and/or decomposition temperature of the salts of either Class I or Class II sintering agents must not exceed one-third of the melting point of the compact to be sintered. In the case of the Class II compounds, the cation of the halide must be below the metal to be sintered on the electromotive force series. The concentration of the salt anions and cations involved depends upon the mechanical strength and the porosity of the sintered mass desired and the impurity levels the resulting mass can tolerate.

The salt is thoroughly mixed with the powder or fiber to be sintered in either dry form or by employing suitable carriers in the form of wet paste in water or other suitable solvents. The mix is then compacted and pressed. In the case of Class II agents, the compact is then heat sintered in a suitable atmosphere.

The following examples are given to further illustrate the present invention:

EXAMPLE I

Approximately 2% by weight of $NH_4Cl$ was added to a sample of 300 mesh commercial zinc powder. The powder and sintering agent were mixed and loaded onto suitable dies. When the mass was compacted at 15,000 p.s.i., the exothermic chemical corrosion liberated sufficient heat to sinter the mass. The excess corrosion agent and the corrosion products were removed by subliming. The resultant compacts were porous and structurally sound.

EXAMPLE II

Approximately 2% by weight of $ZnCl_2$ was added to a sample of degreased 99.99 pure 140 mesh aluminum powder. The chemicals were mixed and compacted in dies employing 15,000 p.s.i. in a mechanical press. The samples of green mass were heat treated in fireproof paper bags at 500° C. for a period of 1 to 2 hours. After completion of heat treatment, the compacts were washed with an acetone-water mixture and dried. The resultant compacts were porous, structurally sound, water stable, and had a 40% porosity.

The porosity may be varied by varying the percentage by weight of the sintering agent. It can be seen from Example II that only 2% by weight of the Class II sintering agent, in the absence of any other binder or filler yielded compacts having 40% porosity.

The porosity is varied by varying the amount of sintering agent. The resulting aluminum structures have particular application as capacitor anodes. Zinc structures have particular application to battery electrodes, however neither are limited to the aforementioned applications.

It is to be appreciated that the present invention resides primarily in the fabrication of porous metal structures which were heretofore difficult to obtain. It will be readily apparent to those skilled in the art that certain variations may be practiced without departing from the scope of the invention. I consider all of these variations and modifications to be within the foregoing description and defined by the appended claims.

Having thus described my invention, I claim:

1. The process of fabricating a porous metal structure from metal powder having an impurity oxide film by powder metallurgy techniques comprising the steps of:
   (a) selecting a sintering agent from the group consisting of the halides of ammonia, aluminum and zinc, hydrazine hydrochloride and ammonium acid oxalate and selecting metal powder having an impurity oxide film from the group consisting of aluminum, zinc, zirconium, magnesium and titanium;
   (b) mixing a determined by weight portion of said sintering agent with said metal powder to be sintered thereby initiating a chemical reaction between said sintering agent and said oxide film carried on the surface of said metal particles;
   (c) pressing said mix to form a compact, said pressure accelerating said chemical reaction between said sintering agent and said oxide film of said metal particles, said chemical reaction cleaning said metal particles in situ and liberating heat sufficient to sinter said compact to thereby form a porous structure; and
   (d) removing the resulting reaction products and the excess of said sintering agent to prevent further sintering of said sintered compact thereby leaving a porous structure.

2. The process of fabricating a porous metal structure from metal powder having an impurity oxide film by powder metallurgy techniques comprising the steps of:
   (a) selecting a sintering agent from the group consisting of the halides of ammonia, aluminum and zinc, hydrazine hydrochloride and ammonium acid oxalate and selecting metal powder having an impurity oxide film from the group consisting of aluminum, zinc, zirconium, magnesium and titanium;
   (b) mixing at least 2 percent by weight of the total weight of the mix of said sintering agent with said metal powder to be sintered thereby initiating a chemical reaction between said sintering agent and said oxide film carried on the surface of said metal particles;
   (c) pressing said mix to form a compact, said pressure accelerating said chemical reaction between said sintering agent and said oxide film of said metal particles, said chemical reaction cleaning said metal particles in situ and liberating heat sufficient to sinter said compact to thereby form a porous structure; and
   (d) removing the resulting reaction products and the excess of said sintering agent to prevent further sintering of said sintered compact thereby leaving a porous structure.

3. The process of fabricating a porous metal structure from metal powder having an impurity oxide film by powder metallurgy techniques comprising the steps of:
   (a) selecting a sintering agent from the group consisting of the halides of ammonia, aluminum and zinc, hydrazine hydrochloride and ammonia acid oxalate and selecting metal powder having an impurity oxide film from the group consisting of aluminum, zinc, zirconium, magnesium and titanium;
   (b) mixing at least 2 percent by weight of the total weight of the mix of said sintering agent with said metal powder to be sintered thereby initiating a chemical reaction between said sintering agent and said oxide film carried on the surface of said metal particles;
   (c) pressing said mix to form a compact, said pressure accelerating said chemical reaction between said sintering agent and said oxide film of said metal particles, said chemical reaction cleaning said metal particles in situ and liberating head sufficient to sinter said compact to thereby form a porous structure; and
   (d) removing the resulting reaction products and the excess of said sintering agent to prevent further sintering of said sintered compact of sublimation at a temperature not greater than one-third the sintering temperature of said metal particles, thereby leaving a porous structure.

4. The process of fabricating a porous metal structure from metal powder having an impurity oxide film by powder metallurgy techniques comprising the steps of:
   (a) selecting a sintering agent from the group consisting of the halides of ammonia, aluminum and zinc, hydrazine hydrochloride and ammonium acid oxalate and selecting metal powder having a impurity oxide film from the group consisting of aluminum, zinc, zirconium, magnesium and titanium;
   (b) mixing at least 2 percent by weight of the total weight of the mix of said sintering agent with said metal powder to be sintered thereby initiating a chemical reaction between said sintering agent and said oxide film carried on the surface of said metal particles;
   (c) pressing said mix to form a compact, said pressure particles in situ and liberating heat sufficient to sintering agent and said oxide film of said metal particles, said chemical reaction cleaning said metal particles in situ and liberating heat sufficient to sinter said compact to thereby form a porous structure; and
   (d) removing the resulting reaction products and the excess of said sintering agent to prevent further sintering of said sintered compact by leaching with a solvent having a low dielectric constant thereby leaving a porous structure.

5. The process of fabricating a porous metal structure from metal powder having an impurity oxide film by powder metallurgy techniques comprising the steps of:
   (a) selecting a sintering agent from the group consisting of the halides of ammonia, aluminum and zinc, hydrazine hydrochloride and ammonium acid oxalate and selecting metal powder having an impurity oxide film from the group consisting of aluminum, zinc, zirconium, magnesium and titanium;
   (b) mixing at least 2 percent by weight of the total weight of the mix of said sintering agent with said metal powder to be sintered thereby initiating a chemical reaction between said sintering agent and said oxide film carried on the surface of said metal particles;
   (c) pressing said mix to form a compact, said pressure accelerating said chemical reaction between said sintering agent and said oxide film of said metal particles, said chemical reaction cleaning said metal particles in situ and liberating heat sufficient to sinter said compact to thereby form a porous structure; and
   (d) removing the resulting reaction products and the excess of said sintering agent to prevent further sintering of said sintered compact by leaching with an acetone and water solvent thereby leaving a porous structure.

6. The process of fabricating a porous metal structure from metal powder having an impurity oxide film by powder metallurgy techniques comprising the steps of:
   (a) selecting a sintering agent from the group consisting of the halide salts of ammonia, aluminum and zinc, hydrazine hydrochloride and ammonium acid oxalate and selecting metal powder having an impurity oxide film from the group consisting of aluminum, zinc, zirconium, magnesium and titanium;
   (b) mixing about 2 to 50 percent by weight of the total weight of the mix of said sintering agent with said metal powder to be sintered thereby initiating a chemical reaction between said sintering agent and said oxide film carried on the surface of said metal particles;
   (c) pressing said mix to form a compact, said pressure accelerating said chemical reaction between said sintering agent and said oxide film of said metal particles, said chemical reaction cleaning said metal particles in situ and liberating heat sufficient to sinter said compact to thereby form a porous structure; and
   (d) removing the resulting reaction products and the excess of said sintering agent to prevent further sintering of said sintered compact thereby leaving a porous structure.

7. The process of fabricating a porous metal structure having a porosity of at least 40 percent from metal powder having an impurity oxide film by powder metallurgy techniques comprising the steps of:
   (a) selecting a sintering agent from the group consisting of the halides of ammonia, aluminum and zinc, hydrazine hydrochloride and ammonium acid oxalate and selecting metal powder having an impurity oxide film from the group consisting of aluminum, zinc, zirconium, magnesium and titanium having surface diffusion energy of about 10 to 15K cal./mole;
   (b) mixing said sintering agent with said metal powder to be sintered thereby initiating a chemical reaction between said sintering agent and said oxide film carried on the surface of said metal particles;
(c) pressing said mix to form a compact, said pressure accelerating said chemical reaction between said sintering agent and said oxide film of said metal particles, said chemical reaction cleaning said metal particles in situ and liberating about 10 to 15K cal./mole to sinter said compact to thereby form a porous structure; and
(d) removing the resulting reaction products and the excess of said sintering agent to prevent further sintering of said sintered compact thereby leaving a porous structure having a porosity of at least 40 percent.

8. The process of fabricating a porous metal structure from metal powder having an impurity oxide film as claimed in claim 2, wherein said sintering agent is about 2 to 50 percent, by weight, of the total weight of the mix.

9. The process of fabricating a porous metal structure from metal powder having an impurity oxide film as claimed in claim 8, wherein said porous metal structure has a porosity of at least 40 percent.

10. The process of fabricating a porous metal structure from metal powder having an impurity oxide film as claimed in claim 2, wherein said sintering agent halides are halide salts of ammonia, aluminum, and zinc.

11. The process of fabricating a porous metal structure from metal powder having an impurity oxide film as claimed in claim 2, wherein said pressing of said compact is at about 15,000 p.s.i.

12. The process of fabricating a porous metal structure from metal powder having an impurity oxide film as claimed in claim 2, wherein said metal powder has a particle size of about 300 mesh.

References Cited

UNITED STATES PATENTS

| 2,848,321 | 8/1958 | Bunbury | 75—27 X |
| 2,982,014 | 5/1961 | Meyer-Hartwig | 75—206 X |
| 3,020,610 | 2/1962 | Rejdak | 75—27 X |
| 3,063,836 | 11/1962 | Storchheim | 75—224 |
| 3,142,892 | 8/1964 | Powell | 75—206 |
| 3,184,306 | 5/1965 | Fish | 75—206 |

FOREIGN PATENTS 14,343  1962  Japan.

CARL D. QUARFORTH, *Primary Examiner.*

BENJAMIN R. PADGETT, *Examiner.*

A. J. STEINER, *Assistant Examiner.*